G. S. CONKLING.
Grain-Drill.
No. 44,785.          Patented Oct. 25, 1864.
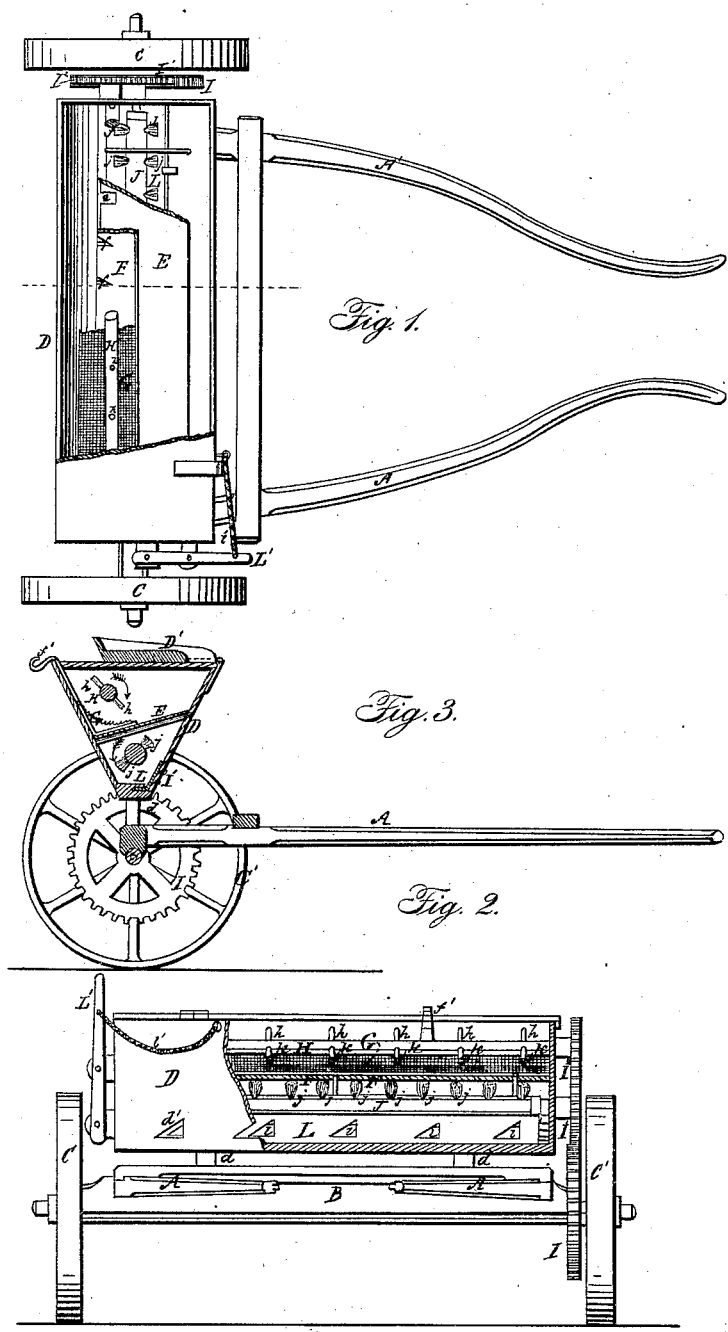
Witnesses:
Inventor:

UNITED STATES PATENT OFFICE.

GEORGE S. CONKLING, OF GOSHEN, NEW YORK.

PLASTER AND SEED SOWER COMBINED.

Specification forming part of Letters Patent No. 44,785, dated October 25, 1864.

*To all whom it may concern:*

Be it known that I, GEORGE S. CONKLING, of Goshen, in the county of Orange and State of New York, have invented a new and Improved Plaster and Seed Sower; and I do hereby declare the following to be a full and exact description of the same, reference being had to the accompanying drawings, making part of this specification, in which—

Figure 1 is a plan or top view of my improved machine, partly in section. Fig. 2 is a front end elevation of the same, partly in section. Fig. 3 is a vertical section in the line $x\,x$, Fig. 1, illustrating more clearly the interior construction of the hopper hereinafter specified.

Similar letters of reference indicate corresponding parts in the several figures.

The object of my present invention is to provide more effectual means for sowing plaster and seed simultaneously; and to this end the invention consists chiefly in forming a hopper with two apartments, the upper one containing a device for breaking the plaster into sufficiently small particles to insure its ready passage through the seed-apertures, and also with a medium for separating straw and other trash from the seed and plaster, while the lower apartment is provided with a shaft with which revolve agitating-brushes to cause the seed and plaster to pass out of the lower apartment as fast as it is supplied from the upper apartment. In connection with the above the invention also includes the employment of gaging devices, to be hereinafter described.

In order that others skilled in the art to which my invention appertains may be enabled to fully understand and use the same, I will proceed to describe its construction and operation.

In the accompanying drawings, A A represent the thills, B the axle, and C C' the carrying-wheels, of my improved machine, all of which may be of common construction.

D is a hopper mounted upon the axle by supports $d\,d$, and having secured upon its top the driver's seat D.

E is a partition whereby the hopper is divided into two apartments, as clearly illustrated in Fig. 3.

In the partition E are formed square apertures $e$, above which is a slide, F, having similar apertures, $f$. By means of a handle, $f'$, the slide F may be moved so as to place the apertures $e$ and $f$ in contraposition, or vice versa, and thus communication between the two apartments of the hopper D may be opened or closed at will. It is manifest that by changing the position of the slide the openings may be varied with great exactness when it is desired to increase or diminish the flow of seed from the upper to the lower apartment of the hopper.

The partition E occupies an inclined position, in order that when the plaster and seed are in the upper apartment of the hopper they will have a constant tendency to move upon a sieve, G, covering the slide F, and adapted to prevent the passage into the lower apartment of any straw or other foreign matter that may be mixed with the seed and plaster. This sieve G forms an arc in its transverse section, and concentrically therewith is placed a shaft, H, which has its bearings in the respective ends or heads of the hopper.

Upon the shaft H are radial projections $h$, which, when the shaft is rotated, perform two functions—namely, keeping the plaster and seed in a state of agitation, thereby insuring the continual flow of the same, and, secondly, crushing or crumbling the plaster into sufficiently small particles to insure its free passage through the seed apertures. The shaft H has rotation imparted to it from the driving-wheel C' through the medium of gear-wheels I I' I².

It will be understood that the plaster and seed are first placed within the upper apartment of the hopper D, and thence flow into the lower apartment through the hoppers $e\,f$. This lower apartment is provided with a shaft, J, which is rotated at the same time and by the same means as the shaft H, and which has inserted into it a series of brushes or bunches of bristles, $j$, which sweep or brush the seed out of the hopper as it passes the upper apartment. The seed, together with the plaster, makes its exit from the lower apartment of the hopper through triangular apertures $d'$, which, by means of a slide, L, having triangular apertures $l$, may be closed or partially closed in the same manner as the apertures $e$.

The slide L may be moved and retained immovably in any position in which it may be placed by a pivoted lever, L′, which is adapted to be rigidly held by a cord, l′.

Having thus described my invention, the following is what I claim as new therein, and desire to secure by Letters Patent:

1. The combination of the rotating shaft H h, sieve G, and rectangular and triangular apertures e f, the whole being employed to agitate the seed and plaster, crush the latter, and separate straw and trash in the manner and for the purpose set forth.

2. The shaft J j, in combination with the triangular apertures d′ l, substantially as and for the purpose specified.

The above specification of my improvement in plaster and seed sowers signed this 20th day of May, 1864.

GEO. S. CONKLING.

Witnesses:
  JAMES H. GRIDLEY,
  OCTAVIUS KNIGHT.